US008417796B2

(12) United States Patent  (10) Patent No.: US 8,417,796 B2
Crosbie  (45) Date of Patent: Apr. 9, 2013

(54) SYSTEM AND METHOD FOR TRANSFERRING A COMPUTING ENVIRONMENT BETWEEN COMPUTERS OF DISSIMILAR CONFIGURATIONS

(75) Inventor: David Bruce Crosbie, Somerville, MA (US)

(73) Assignee: Leostream Corporation, Waltham, MA (US)

( * ) Notice: Subject to any disclaimer, the term of this patent is extended or adjusted under 35 U.S.C. 154(b) by 2073 days.

(21) Appl. No.: 11/333,092

(22) Filed: Jan. 17, 2006

(65) Prior Publication Data

US 2007/0168478 A1 Jul. 19, 2007

(51) Int. Cl.
G06F 15/177 (2006.01)
(52) U.S. Cl. ......... 709/220; 709/219; 709/223; 709/224
(58) Field of Classification Search .................. 709/220, 709/219, 223, 224; 711/170, 173; 718/1; 719/321, 324
See application file for complete search history.

(56) References Cited

U.S. PATENT DOCUMENTS

| | | | |
|---|---|---|---|
| 5,655,148 A | 8/1997 | Richman et al. | |
| 5,787,246 A | 7/1998 | Lichtman et al. | |
| 6,003,097 A | 12/1999 | Richman et al. | |
| 6,098,158 A * | 8/2000 | Lay et al. ........................ | 711/162 |
| 6,282,712 B1 | 8/2001 | Davis et al. | |
| 6,530,018 B2 | 3/2003 | Fleming, III | |
| 6,535,998 B1 | 3/2003 | Cabrera et al. | |
| 6,681,323 B1 | 1/2004 | Fontanesi et al. | |
| 6,718,463 B1 | 4/2004 | Malik | |
| 6,754,722 B2 | 6/2004 | Herzi | |
| 6,804,774 B1 * | 10/2004 | Larvoire et al. ................... | 713/2 |
| 6,820,214 B1 | 11/2004 | Cabrera et al. | |
| 6,831,752 B1 | 12/2004 | Matsuo | |
| 6,934,956 B1 | 8/2005 | Allen | |
| 6,944,867 B2 | 9/2005 | Cheston et al. | |
| 7,356,679 B1 * | 4/2008 | Le et al. ............................. | 713/1 |
| 7,383,327 B1 * | 6/2008 | Tormasov et al. ............ | 709/220 |
| 2003/0191911 A1 | 10/2003 | Kleinschnitz et al. | |
| 2005/0193245 A1 | 9/2005 | Hyden et al. | |
| 2006/0288168 A1 * | 12/2006 | Stevenson ....................... | 711/115 |
| 2007/0006205 A1 * | 1/2007 | Kennedy et al. ............... | 717/168 |
| 2007/0283343 A1 * | 12/2007 | Aridor et al. .................... | 717/174 |

OTHER PUBLICATIONS

User State Migration in Windows XP, Downloaded Dec. 15, 2006, form www.microsft.com Internet web site, Microsoft, Redmond WA, 2006.

* cited by examiner

*Primary Examiner* — LaShonda Jacobs
(74) *Attorney, Agent, or Firm* — Shalom Wertsberger; Saltamar Innovations

(57) ABSTRACT

A system and method for migrating a computer to another computer having dissimilar hardware, wherein a preparation stage for the transfer of a disk image between the origin and target computer comprise analyzing the origin computer and modifying certain parameters therein while operating under its native operating system. After the modification an image of the origin computer is taken and sent to the second computer. The second computer can then boot the image as the necessary changes for booting the target machine were made at the origin computer. The invention is particularly useful for transferring physical computer to a virtual machine environment, where it minimizes the time the origin computer is out of service, where the transfer may occur remotely to the origin computer or the target computer. Most importantly, the invention provides a very high rate of success in migrating a physical system to a virtual system.

24 Claims, 4 Drawing Sheets

SYSTEM AND METHOD FOR TRANSFERRING A COMPUTING ENVIRONMENT BETWEEN COMPUTERS OF DISSIMILAR CONFIGURATIONS

FIELD OF THE INVENTION

The present invention relates generally to transferring operating environments between computers, and more particularly to a method and system for affecting such a transfer automatically.

BACKGROUND OF THE INVENTION

Many computer systems utilize a large number of servers to provide various computer services to their users. Maintaining the large number of servers is costly and time consuming. Oftentimes the servers are configured with outdated hardware, and software that depends to some extent on that hardware. A common solution in those cases is the use of virtual machines. Virtual machines are computer environments, one or more of which may be executed on a single physical computer, wherein each of those environments known as virtual machines, allows an operating system to operate independently as if it was operating on a single dedicated computer. The virtual machine (VM) provides virtualized hardware that the operating system is configured for and that may be mapped to actual hardware. The use of a virtual machine allows cost effective provision of the services provided by the physical server. Thus a virtual machine may be used for replacing an old server, providing a redundant online server for disaster recovery, replacing outdated hardware with new, and the like.

Modern computer operating systems such as Microsoft's Windows and Linux separate the operating system from variations in the underlying hardware through the use of meta layers such as hardware drivers and Hardware Adaptation Layers (HAL). These present the operating system with a consistent interface for accessing various hardware devices in varying configurations. The computer native operating system i.e. the operating system that contains the computing environment of interest and the environment which is to duplicated, has been customized to the hardware it operates on.

Commonly, in a process well known in the art, during the installation phase of an operating system the computer hardware configuration is detected and the relevant drivers and HAL installed. Once the operating system is installed and running it is often necessary to add or remove hardware without having to reinstall the operating system, applications, and data. By way of example, in x86 architecture based computers with a PCI bus the process has been largely automated with the advent of "Plug and Play" technology. Amongst other settings, this process automates the assignment of interrupts and I/O (Input and Output) ports and addresses. However transferring an image of an existing computer system to another is complicated. Certain hardware related problems oftentimes cause malfunction of the old software which expects a certain hardware configuration, or malfunction of the new hardware that is given instructions for hardware that is not available. While transfer of data only between computers may be relatively easy to achieve in most cases, the provision of the same environment in terms of functionality, including user and software settings, legacy software functionality, legacy peripherals functionality, and the like, presents significant difficulties.

The process of detecting new hardware and installing the relevant driver has many known implementations and variations. By way of example, U.S. Pat. No. 5,78,246 to Lichtman et al. describes a system for configuring device drivers. U.S. Pat. No. 5,655,148 to Richman et al, and others further describe different methods for identifying, loading, and configuring device drivers. U.S. Pat. No. 6,003,097 to Richman further discloses using registry data structure to load and configure various drivers. U.S. Pat. No. 6,530,018 to Fleming, describes an apparatus for automatically retrieving and installing drivers over a network. U.S. Pat. No. 6,718,463 to Malik goes further to describe an apparatus in which a computer system is booted to a point in which a file system is available, at which point drivers and other settings are copied from the system to removable storage, allowing the system to boot the computer from the removable storage providing user settings, software and similar functionality. (The terms "boot" and "Reboot" the computer implies starting a computer (physical or virtual) and providing operational control to a program, called an Operating System or OS in short)

U.S. Pat. No. 6,282,712 to Davis et al. provides for a system for a system for automatically installing software on heterogeneous computer systems. U.S. Pat. No. 6,934,956 to Allen discloses an apparatus and method for installing an operating system using an external configuration file.

U.S. Pat. No. 6,535,998 to Carbera et al. discloses a method and system for recovering from a system failure wherein the failed system is restored to a new system that has different hardware. Hardware state is preserved during a backup process, and following a failure, a restore is performed to the extent possible using that hardware state but on a system having a different hardware configuration. U.S. Pat. No. 6,944,867 to Cheston et al. discloses a method for providing a single preloaded software image onto multiple types of computer systems, using a hidden partition in the system disk drive.

US publication No 2005/0193245 to Hayden et al. discloses a disaster recovery system where the files that define the user environment of the file server are replicated to a virtual machine at a disaster recovery site. To switch over user access from the active site to the disaster recovery site, the disaster recovery system determines whether there are sufficient network interfaces and file system mounts at the disaster recovery site. If so, the required resources are reserved, and user access is switched over. If not, an operator is given a list of missing resources or discrepancies, and a choice of termination or forced failover. Interruptions during the failover can be avoided by maintaining a copy of user mappings and a copy of session information at the disaster recovery site, and keeping alive client-server connections and re-directing client requests from the active site to the disaster recovery site. This patent is an example of the difficulties presented in replicating the complete server environment into a virtual machine.

Virtual machines are also old in the art, and are readily available commercially, as well as methods of transferring an image of origin computer environment to the virtual machine or to another target computer. The common method of achieving this task is by rebooting the origin computer to a secondary operating system different than the native operating system (e.g. to a DOS operating system in a native Windows operating system computer (DOS and Windows are trademarks of Microsoft Corporation of Redmond, Wash., USA)). This is done to avoid any intervention by the native of the operating system in the next step, which is the generation of a data image of disks coupled to the origin computer, and transferring that image to the target computer. At the target computer a program analyzes the image, and makes certain modifications directed to fitting the image to the target environment. Such changes include changing drivers, changing configuration settings such as Windows registry settings in a Windows environment, or changes to inittab or RC files in a Linux environment, and the like. After the changes are affected, the transferred operating system is booted on the target computer, preferably within a virtual machine environment.

The known methods described above has several shortcomings, principle upon which is the fact that the non-native operating system is often unaware of environment nuances and other configuration settings that were made to fit the operating system to the legacy hardware. Thus for example, if the native operating system has been operating a certain disk controller, the non-native secondary operating system needs to have drivers for this particular hardware. The disk may be arranged into several partitions that the secondary operating system may not be aware of, and the like. Moreover, merely the use of a second operating system forces a reboot of the origin computer, which is often undesirable.

All of the above cited patents focus on installing or modifying an operating system so that it installs on hardware computer i.e. power it down, make a copy of its disks, and power it up again. Avoiding reboot offers the added advantage of allowing such operation to be performed remotely, avoiding the need to send personnel to the origin computer. Other problems of the known art is the lack of handling of software that is closely tied to particular hardware in the origin machine—removing this hardware can cause the application to crash the operating system.

There is therefore a clear and unresolved need for a system and method for moving an existing computer environment, including the operating system, settings, and the like, to a new computing platform using different hardware configuration and preferably without the need to shut the origin machine down during the process. The present invention provides such a system and method.

SUMMARY OF THE INVENTION

In one aspect of the present there is provided therefore method for transferring a data image from an origin computer coupled to at least one storage medium, and origin operating system and computing environment image stored on the medium, to a second computer, the method comprising the steps of executing a host agent on the second computer. On the origin computer under control of the origin operating system: profiling the origin computer; modifying certain origin computer configuration parameters to fit the target computer configuration; reading a data image of the storage medium, and transmitting the image to the host agent on the target computer. The host agent makes the image bootable on the second computer, or on a virtual machine executed thereon; wherein the image reflects changes made to the configuration parameters during the step of modifying, prior to transmitting the image to the target computer. Doing so allows the target computer to receive an image that is known to be bootable in the target environment. Optionally, after the boot of the target computer, additional modifications may be carried out.

Optionally, the method further comprises restoring the original computer configuration to the configuration prior to the step of modifying.

Preferably the step of profiling comprises analyzing the origin computer hardware, operating system, operational programs, settings, and the like. More preferably, the step of profiling further comprises the step of consulting a rule base.

Optionally the method further comprises the step of communicating the result of profiling to the host agent.

A preferred example of the step of modifying comprises installing at least one driver into the origin computer. Another preferred example of modifying comprises modifying the booth path of the origin computer. Preferably, the modifications to the origin computer are written to the storage medium. Yet another preferred step, wherein the storage medium is a disk drive, comprising de-fragmenting the disk drive.

In the most preferred embodiment, wherein the storage medium is a disk drive having a plurality of sectors, the step of reading is performed for each sector of the disk drive, i.e. the read operation is performed 'sector by sector'.

The method is especially beneficial when the second computer is a virtual machine host of at least one virtual machine, and wherein the virtual machine is a target computer for receiving the data image. In such most preferred embodiment, the host agent creates a virtual machine on the virtual machine host, to serve as the target computer, most preferably in accordance with data received from the profiling step. The host agent, a portion thereof, or a program executed within the virtual machine, receives the transmitted image data at the virtual machine host and writes the data to a virtual disk readable by the target computer. If the host agent performs this operation the virtual machine need not be running. After the image is transferred it may be executed on the target computer—either a physical or a virtual machine. Preferably after the image is executed, the method comprise the step of modifying the target computing environment. Such modification may include by way of example, modifying network address of the target computer, removing unneeded elements, and the like.

Further optionally, the method comprises the step of disabling selected programs from executing on the second computer prior to transmitting the image data. Preferably, the selected programs include virus scanners.

In the most preferred embodiment the method further comprises the step of placing the origin computer in quiescent mode.

In yet another aspect of the present invention, there is presented a system for migrating a computing environment from an origin computer having an operating system and a storage device, to a second computer, wherein data may be transferred between the origin computer and the second computer via a communication link, the system comprising a host agent operable on the second computer and a transporter program operational under the operating system. The transporter program comprises a profiler for profiling the origin computer; an origin configurator for modifying the origin computing environment; a raw disk imager for reading an image of data in the storage device; a transmitter for transmitting the image to the agent environment over the communication link. Optionally, the system further comprises a restorer module, operational for restoring the origin computer state to the state before the step of modifying. Preferably, the profiler is operational for profiling the hardware and/or software configuration of the origin computer.

Preferably, the system further comprises a rule base for directing operations of the origin configurator, the host agent, or a combination thereof.

Most preferably, the second computer is a virtual machine host of at least one virtual machine, and the virtual machine is a target computer for receiving the data image. Optionally the host agent creates the virtual machine, preferably in accordance with data received from the profiler. Optionally the host agent also configures the virtual machine, also preferably in accordance with the data received from the profiler.

Also preferably the system comprises a raw disk writer for writing image data to a disk readable by target computer. The disk may be a physical or a virtual disk, or any other data storage device. In the most preferred embodiment the raw disk writer is operated under the virtual machine environment. Further preferably, the raw disk writer is utilized to boot the virtual machine, i.e. be bootable and operating from within the virtual machine.

Preferably the system further comprises a device driver for providing an operating interface for at least one device on the target computer, the device driver being installable on the origin computer. Most preferably, the target machine is a virtual machine. Thus the device driver may be a virtual device driver that interacts with further device drivers for providing the interface to an actual device.

Most preferably the transporter program further comprises a restorer operable to undo the modifications made to the origin machine configuration and restore it to the original configuration, the original computer may then continue its service after the migration process completed, and service disruption time is minimized.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

DETAILED DESCRIPTION

For brevity and ease of demonstrating the principles and operation of the present invention, the following description of some preferred embodiments will utilize an example of a physical server being transferred into a virtual machine, under the Windows operating system. The skilled in the art will recognize that in light of the teachings provided in these specifications, the system and the method described hereinunder will operate similarly for transferring any computer environment, e.g. from one physical computer to another, from one virtual machine to another, or from a virtual machine to a physical computer, and that the invention and the scope of the claims extends to such modifications. The popular Windows operating system was selected but other operating systems are contemplated and specific steps will be clear to the skilled person. The selection of the virtual machine also provides an explanation of the more difficult embodiment, and once the more complex process of virtual machine migration is understood in light of these specifications, the modification of the invention for operating in simpler environments such as migration between two physical computers, two virtual computers, or a virtual computer to a physical computer will be easily understood by the skilled in the art.

Figure 1:
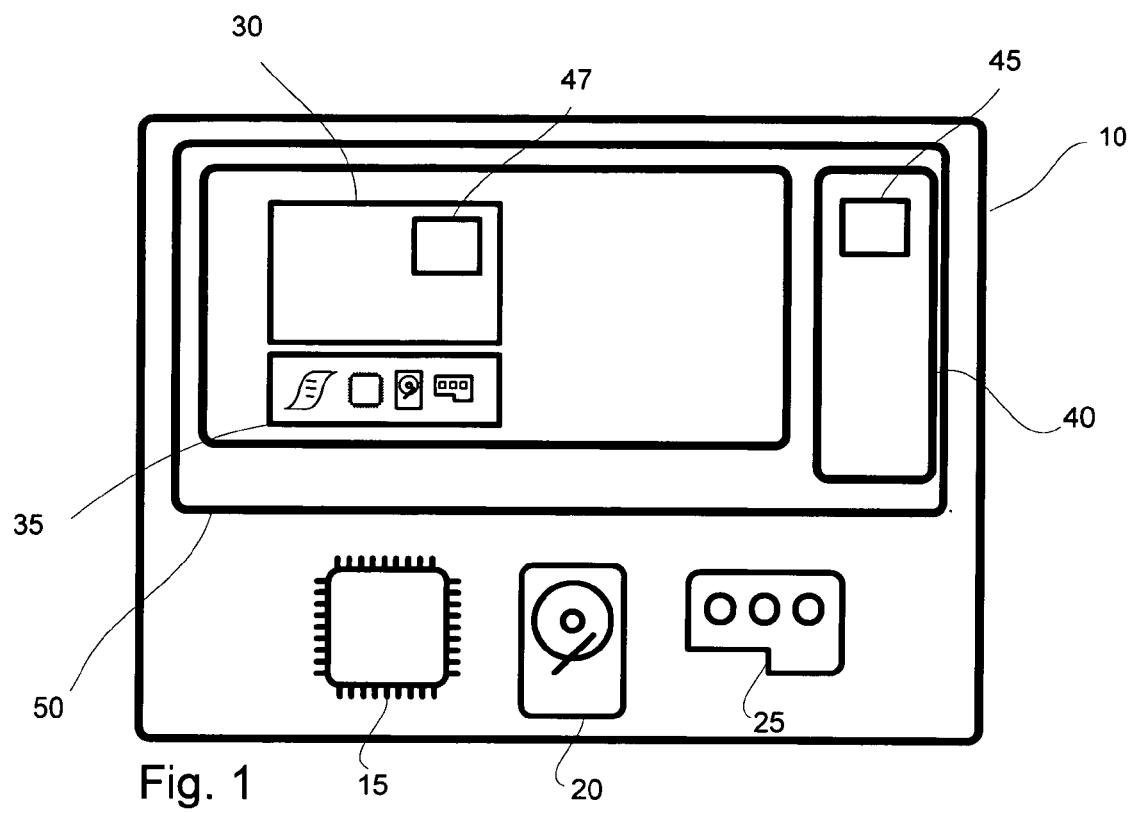
FIG. 1 depicts a simplified block diagram of a virtual machine.

Referring now to FIG. 1, a simplified block diagram of a typical virtual machine. A host computer 10 is used to host the virtual machine. The host computer has at least one physical CPU 15, at least one storage device 20 (that will be referred generally as a 'disk' hereinafter), at least one network interface 25, and the like. A virtual machine environment 30 is executed on the host computer. Virtual hardware 35 is provided and the operating system of the virtual machine interfaces with the physical host interface hardware via a virtualization layer that is commonly called a 'virtual machine' 50, as it creates an environment that the virtual machine may operate in without any knowledge of the underlying physical setup. In the preferred embodiment a virtualization generator 40 set exists for generating the virtual machine and for providing an interface to other environment settings such as allowing sharing of resources, and the like. The virtualization generator 40 is responsible for generating the virtual machine environment such as the installation of certain software drivers to provide the likes of virtual drivers, virtual devices, and in some cases certain software devices that need to be modified for a virtual machine to operate. In the preferred embodiment a host agent 45 operates closely with the virtualization software, and in some embodiments may be integrated with the virtualization generator. The host agent communicates with the transporter. In such embodiment the host agent is preferably capable of instructing the virtualization software to generate a virtual machine in accordance with information received from the origin computer, to boot such machine, and to shut it down. In other embodiments, the host agent may operate as a separate entity from the virtual machine, and execute actions, such as creation of a virtual machine, customization of new or existing server, receiving image data and storing it, and the like.

Figure 2:
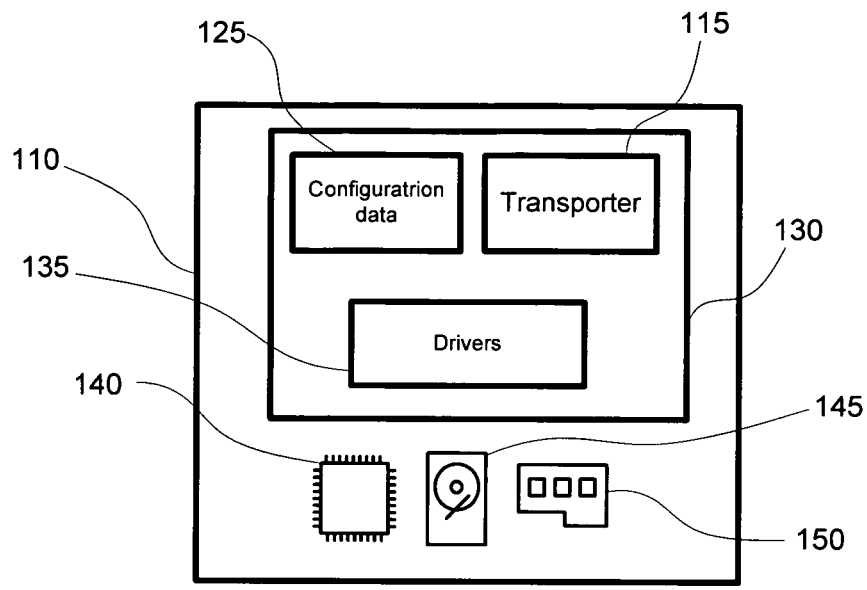
FIG. 2 depicts a schematics of a system in accordance with the preferred embodiment of the invention.

FIG. 2 depicts a simplified block diagram of a typical origin computer 110. The origin computer has at least one CPU 140, disk 145, and network adaptor 150. It is operated with an operating system 130 and utilizes a variety of drivers 135 to interface with those devices. The operating system operation is directed by configuration data 125. Transporter program 115 operates within the environment of the operating system. Unlike known server migration solutions, the operation from within the native operating system allows the transporter program to access devices using the current origin environment, allows access to disk partitions that are in accordance with the origin configuration and the like, as well as reduces downtime of the origin computer, both provide significant advantages.

Figure 3:
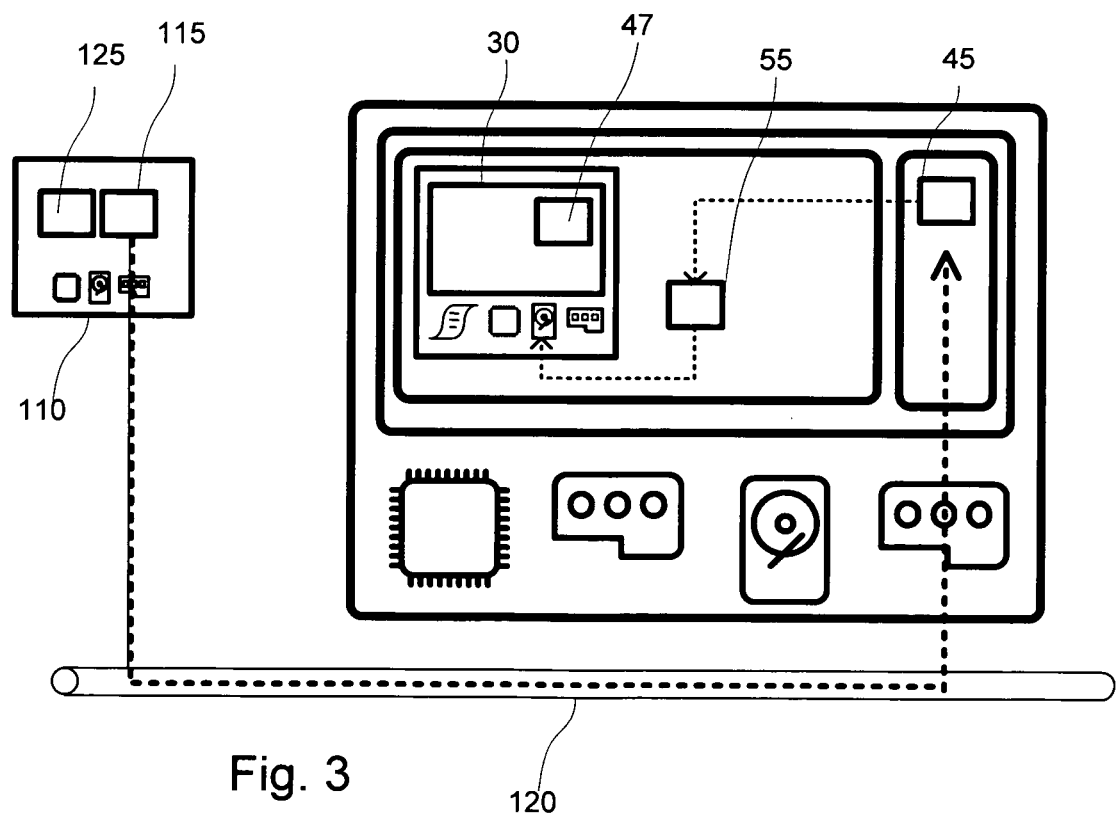
FIG. 3 depicts a simplified diagram of a system in accordance with the preferred embodiment.

As seen in FIG. 3, for completion of the basic system a communication link 120 capable of transporting data between the origin and the target computers is required. If the origin and the target computers are on a single computer, as may be the case when transferring images between virtual machines, the computer bus may act as a communication link. Otherwise, any communication link with sufficient bandwidth may be utilized, the most common communication link being a network.

Figure 4:
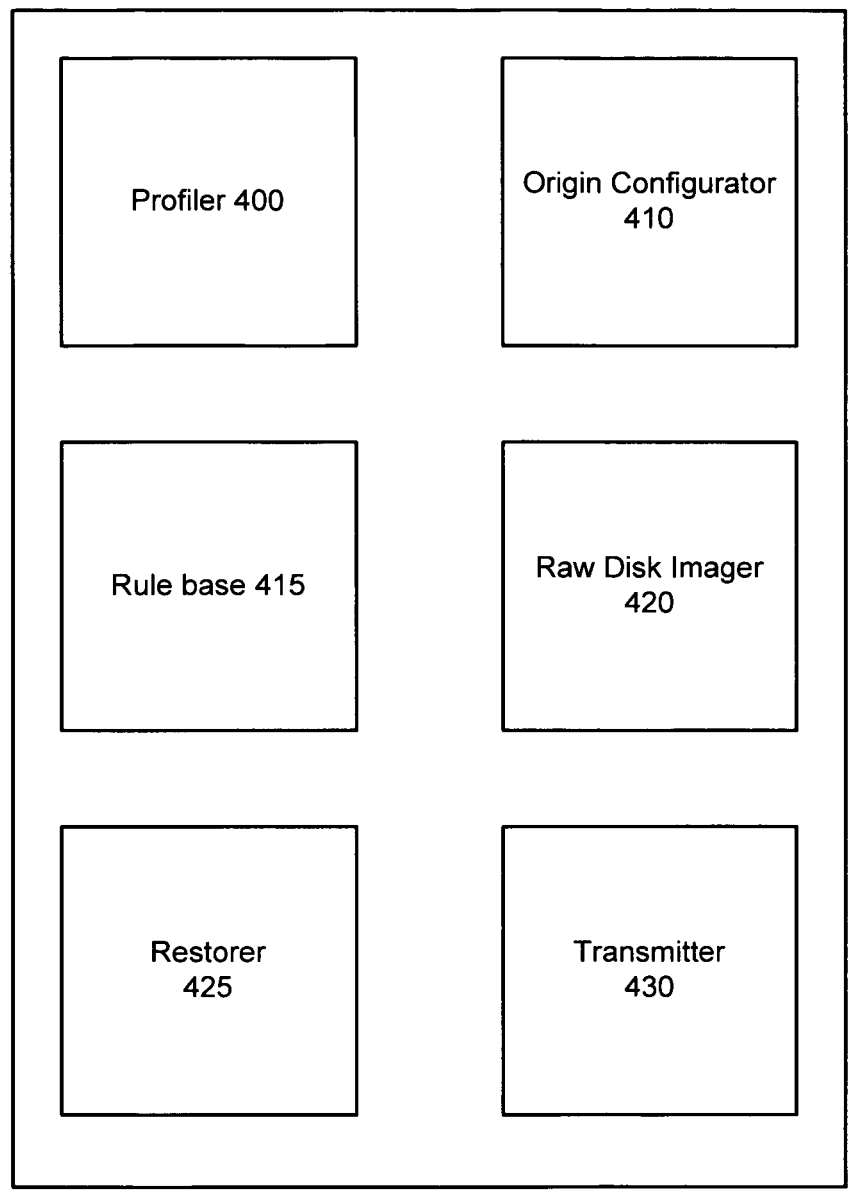
FIG. 4 depicts primary components of a transporter program in accordance with the preferred embodiment.

FIG. 4 depicts a simplified block diagram of a transporter program in accordance with the preferred embodiment of the invention. After a high level explanation of the system operation as shown in FIG. 5, the operational details of the transporter program components will be clearer as well as the more detailed explanation of the actions taken in the steps depicted in FIG. 5.

Figure 5:
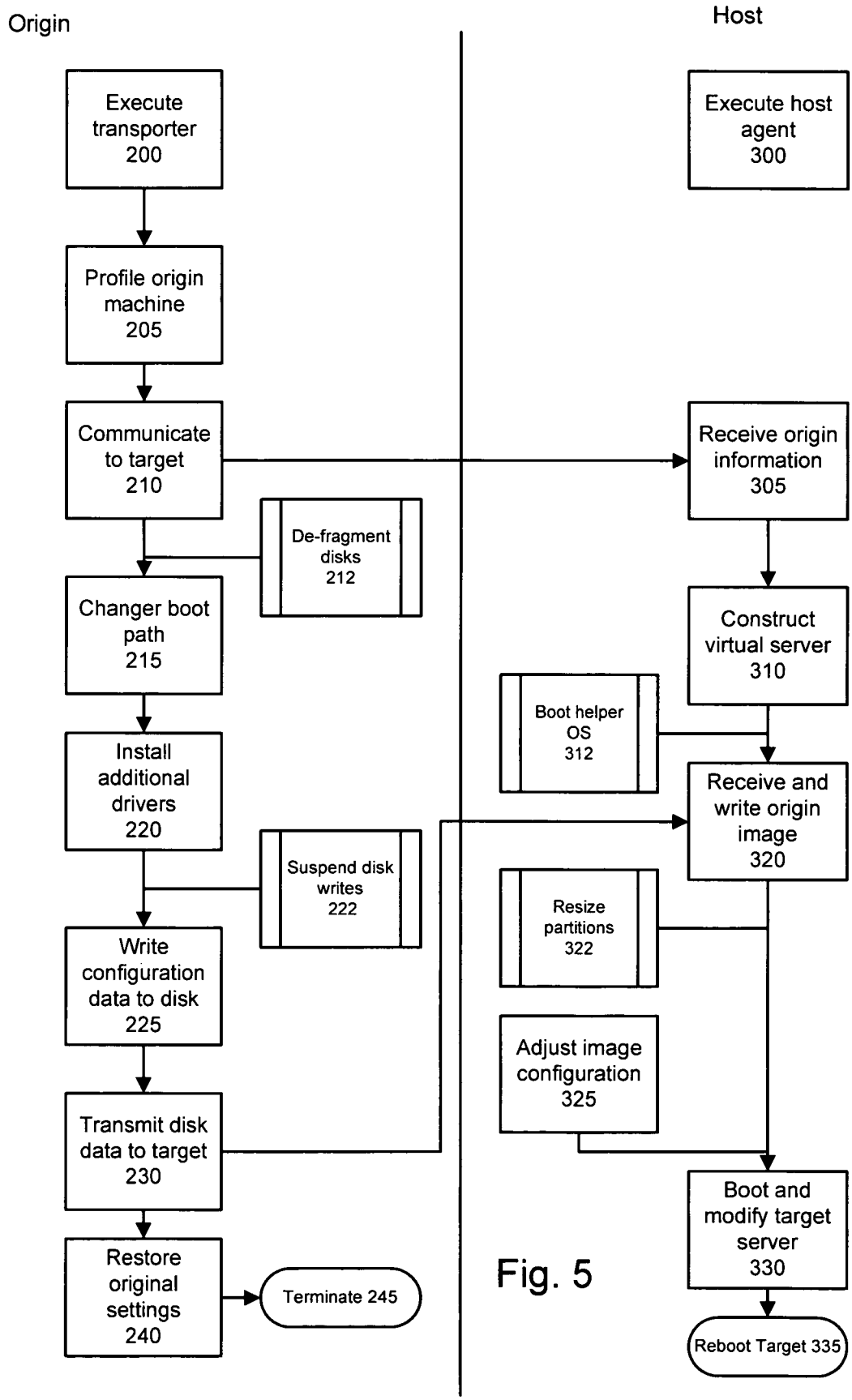
FIG. 5 is a simplified a block diagram of steps taken in a method according to a preferred embodiment of the invention.

As shown in FIG. 5, the operation begins with executing the transporter program 200 on the origin computer and the host agent on the host computer 300. The profiler begins profiling the origin computer 205. Data from the profile analysis is communicated to the host agent 210. After receiving the origin computer information 305, the host agent constructs and/or configure 310 the virtual machine. The virtual machine is created to mimic as closely as applicable the origin computer environment subject to user manual overrides such as memory and disk size, and the like. Origin configurator 410 modifies the boot configuration of the origin computer (215 and 220). The raw disk imager 420 reads the origin computer disks and sends them across the network 120 to the target host. The target computer receives and writes the data into the target computer disks 320. The target computer is booted and changes are being made to its operating parameters 330 as needed. The target computer is then preferably booted again 335 and is ready for operation. After the disk data is read and transferred to the target computer, the configuration of the origin computer is restored, and the migration operation is complete.

The profiler 400 examines and generates a profile of the origin computer which includes details and pertinent parameters of the origin computer. By way of example the profiler data may comprise memory size, number of disk drives, partition layout, disk geometry, file system type, and the like. Further profiling analysis may include analysis of device drivers, such as disk drivers, processor (HAL), network configuration, as well as analysis of the boot profile. Analysis of the registry is also preferably conducted to ensure coherence. Optionally, analysis and profiling of installed programs and settings is also conducted. Most preferably, the profiler further attempts to identify virus scanners and other programs that are sensitive to configuration changes. Virus scanners are specifically prone to causing conversion problems, especially those that link into filter drivers, and so may crash the operating system in a new hardware environment. Drivers and files needed for the new environment are extracted from the relevant service packs, from the target computer or its operating system, or in some cases from existing files on the origin computer, and placed in a temporary file. Also preferably the profile includes state of defragmentation 212 of the origin disk or disks.

In the preferred embodiment, the profiler utilizes a rule base 415 that provides solutions to known configurations or configuration problems. The rule base allows easy handling of specific known problems or preferred methods of implementations. By way of example, a rule may specify that a certain virus scanner requires certain steps to disable operation. Yet another rule example is a driver that is known to be incompatible with the target virtual hardware and may call for special modification of the target computer environment. In other embodiments the rule base may be located at the target machine, or at another remote site, and may be provided on a query basis, or as a whole for download. A rule base is an improvement of the operation of the basic profiler, and is not a necessary portion of the transporter program. The conclusions generated by the profiler, whether derived from the rule base or from heuristics, are used by the host agent, the origin, configurator, or both.

The profiler communicates with the host agent (210 and 305) on the target computer and reports parameters regarding the origin computer. Such parameters will allow the host agent to better construct or configure the virtual machine at 310, and also possibly assist in modifying the target operating system configuration.

Origin configurator 410 performs modifications to the origin computer environment, as required to create a computing image that will allow booting the target computer. Examples of modifications which may be performed by the origin configurator include modifying the boot path 215 (e.g. in the file boot.ini in Windows operating environment) so as to point to different HAL and kernel, installing drivers 220 that may be needed on the target system, changing settings, and the like. As the origin computer does not require a reboot in the migration process, any incompatibility of the target drivers and the origin computer are irrelevant. The origin configurator may also utilize the rule base and the results generated by the profiler, and in some embodiments receive data from the host agent, to assist in selecting desired drivers and the like. Preferably, the origin configurator also makes copies of the existing drivers, kernels, and registry settings—so that it is possible to restore the origin computer state again from the virtual machine environment.

Optionally the origin configurator performs disk defragmentation 212, preferably using tools provided by the native operating system.

The environment changes made by the origin configurator are written to disk 225 as applicable, and the origin machine is placed in quiescent mode, i.e. disk content modifications are disabled 222, except if required by the transporter program. If the machine is not placed in quiescent mode, data consistency may be compromised and certain write operations, or portions thereof, may not be recorded in the target computer.

The raw disk imager 420 is constructed to read the local disks in the origin computer, and send them 230, utilizing transmitter 430, to the target computer. The raw disk imager preferably reads each sector of the disk on a sector by sector basis. It does so for all partitions that are desired in the target computer, which is commonly all the partitions which are active on the origin computer. The host agent receives the data and writes it 320 to the target computer disks, maintaining as far as possible a mapping of the sectors similar to the mapping of the origin computer. In a virtual environment this is preferably done with the virtual machine running. Thus, the virtualization layer attends to the mapping automatically, without any restraints on the actual layout of the data on the host computer physical disk.

In the preferred embodiment the transmitter utilizes an IP network as the communication link, and pre configured sockets to transfer the raw data. However the skilled in the art will recognize that any method of transferring the data such a direct wire connection, storing the image data, utilizing an intermediary, and the like are merely a question of technical choice and specific configurations. In the most preferred embodiment the communication link 120 is a secured link, i.e. the data is encrypted and handshake protocols between the transmitter 420 and the host agent or the raw disk writer guarantee error free and secure image transfer.

The writing of the raw disk data is carried out by a raw disk writer 55. Oftentimes the underlying organization of the virtual disk is unknown. In order to facilitate the migration process in such cases, as well as release it from changes that may occur, in the most preferred embodiment raw disk writer 55 is a stand-alone program which can be considered as a "mini operating system". By that term is meant that the raw disk writer may be booted 312 by the virtual machine just as if it was any other operating system. When the raw disk writer is invoked as the 'operating system' 310 of the target virtual machine, the services of the virtual machine are available to it. Therefore, the program is able to write into the virtual machine virtual disk using common service calls (such as interrupt 13 in a common X86 architecture) and ignore any details of the underlying implantation of those virtual disks. For the purpose of these specifications, the raw disk writer, whether a stand alone 'mini operating system', program operating outside the virtual machine, or a program operating within the virtual machine, may be considered a part of the host agent. The host agent thus has at least those two major functions: a) creating and or configuring the virtual machine, preferably in accordance with data received from the profiler, and b) writing the disk data as transferred from the transporter. If desired, and when sufficient details of the disk virtualization are known, the writing of the raw disk image may be conducted before the virtual machine is operational. Optionally, the host agent or the raw disk writer may modify the image 325 as needed. A common non-limiting example of such modifications may include resizes the partitions 322 either before or after the raw image has been copied.

Once the copying of the disk content is complete, the virtual machine may be rebooted into the operating system copy of the origin computer. As the origin configurator changed the environment, the virtual machine will be able to safely complete the boot process. Preferably, a target configurator 47 executes automatically under the target computer operating system, and senses that it operates on the target computer by identifying differences between the origin and target computers. Most commonly such differences will include different MAC (Media Access Code) of network adaptors, processor details, and the like. The target configurator then modifies 330 the target server environment. By way of example the modifications may include removal of obsolete drivers, change the HAL and kernel files, modify the boot parameters (boot.ini), and the like. Optionally, the target configurator also changes the networking parameters of the target computer, such as IP address and network identification to fit the target server to its new environment and to avoid conflicts such as duplicate IP (Internet Protocol) numbers. Other changes may include changing of drivers, removal of drivers and other files and settings that are no longer needed, and the like. It is however noted that many modern operating systems are able to take those steps independently during or after their boot process, and by doing so may be considered as an extension of the target configurator.

At the origin machine, restorer module 425 begins restoring 240 the origin computer to a known prior state, preferably the condition the origin computer was in before the migration operation began. Thus the drivers installed by the origin configurator 410 are un-installed, changes to the boot.ini file and similar parameters are reversed, and other settings are restored. Services that were terminated before the copying of the disk data may be restarted, and the origin computer becomes available again to its users, in most cases without requiring even a single reboot. Thus, if the embodiment of the invention is the preferred embodiment, users will only be exposed to minimal downtime of their server. After the restoration is complete the transporter may terminate 245 or reboot the machine if desired. Moreover, as the origin computer may be accessed throughout the migration operation, the process can be preformed from a location remote to the origin computer using any one of applications that allow remote operation on a computer.

If desired, the restorer 425 may modify network address and operating parameters on the origin computer, such as addresses, domain names, and the like. If this is done, there is no need for the target virtual machine to modify those parameters, as described above.

It will be appreciated that the invention is not limited to what has been described hereinabove merely by way of example, and with an eye towards brevity and simplicity so as to aid the reader in understanding the principles of operation of the invention. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A method for transferring a data image from an origin computer coupled to at least one storage medium, and origin operating system and computing environment image stored on the medium, to a second computer, the method comprising the steps of:
   executing a host agent on the second computer;
   on the origin computer under control of the origin operating system:
   profiling the origin computer;
   modifying certain origin computer configuration parameters to fit the target computer configuration;
   reading a data image of the storage medium, and transmitting the image to the host agent for making an image bootable on the second computer, or on a virtual machine executed thereon;
   wherein the image reflects changes made to the configuration parameters during the step of modifying, prior to the step of transmitting.

2. A method as claimed in claim 1 further comprising the step of restoring the origin computer configuration to the configuration prior to the step of modifying.

3. A method as claimed in claim 1 wherein sad step of profiling comprises analyzing the origin computer hardware.

4. A method as claimed in claim 1 wherein the step of profiling comprises analyzing the origin computer operating system.

5. A method as claimed in claim 1 wherein the step of profiling comprises analyzing programs operational on the origin computer.

6. A method as claimed in claim 1 wherein the step of profiling further comprises the step of consulting a rule base.

7. A method as claimed in claim 1 further comprising the step of communicating the result of the step of profiling to the host agent.

8. A method as claimed in claim 1 wherein the step of modifying comprises installing at least one driver into the origin computer.

9. A method as claimed in claim 1 wherein the step of modifying comprises modifying the booth path of the origin computer.

10. A method as claimed in claim 1 wherein the storage medium is a disk drive, and further comprising the step of de-fragmenting the disk drive.

11. A method as claimed in claim 1 wherein the storage medium is a disk drive having a plurality of sectors, and wherein the step of reading is performed for each sector of the disk drive.

12. A method as claimed in claim 1 wherein the second computer is a virtual machine host of at least one virtual machine, and wherein the virtual machine is a target computer for receiving the data image.

13. A method as claimed in claim 12, wherein the host agent creates a virtual machine on the virtual machine host, to serve as the target computer.

14. A method of claim 13 wherein the host agent creates the virtual machine in accordance with data received from the step of profiling.

15. A method as claimed in claim 12, wherein the host agent configures a virtual machine on the virtual machine host, to serve as the target computer.

16. A method of claim 15 wherein the host agent configures a virtual machine on the virtual machine host, to serve as the target computer in accordance with data received from the step of profiling.

17. A method as claimed in claim 12 further comprising the steps of receiving the transmitted image data at the virtual machine host and writing the data to a virtual disk readable by the target computer.

18. A method as claimed in claim 17, wherein the step of writing is preformed by a program executed within the virtual machine environment.

19. A method as claimed in claim 12 further comprising the step of executing the transferred image on the target computer.

20. A method as claimed in claim 19, further comprising the step of modifying the target computing environment after the step of executing.

21. A method as claimed in claim 20, wherein the step of modifying comprises modifying network address of the target computer.

22. A method as claimed in claim 1, further comprising the step of disabling selected programs from executing on the second computer prior to the step of transmitting.

23. A method as claimed in claim 22, wherein the selected program comprise virus scanners.

24. A method as claimed in claim 1, further comprising the step of placing the origin computer in quiescent mode.

* * * * *